United States Patent
Krucinski et al.

(10) Patent No.: US 11,400,822 B2
(45) Date of Patent: Aug. 2, 2022

(54) SUSPENDED CHARGING CABLE SYSTEM FOR ELECTRIC VEHICLES

(71) Applicant: ABB Schweiz AG, Baden (CH)

(72) Inventors: Martin Krucinski, Glastonbury, CT (US); Gregory Cole, West Hartford, CT (US)

(73) Assignee: ABB SCHWEIZ AG, Baden (CH)

( * ) Notice: Subject to any disclaimer, the term of this patent is extended or adjusted under 35 U.S.C. 154(b) by 305 days.

(21) Appl. No.: 16/422,331

(22) Filed: May 24, 2019

(65) Prior Publication Data

US 2020/0369167 A1 Nov. 26, 2020

(51) Int. Cl.

| | |
|---|---|
| *B60L 53/18* | (2019.01) |
| *B60L 53/16* | (2019.01) |
| *H02J 7/02* | (2016.01) |
| *B60L 53/34* | (2019.01) |
| *B60L 53/36* | (2019.01) |
| *B60L 53/30* | (2019.01) |
| *H02J 7/00* | (2006.01) |

(52) U.S. Cl.
CPC .............. *B60L 53/18* (2019.02); *B60L 53/16* (2019.02); *B60L 53/305* (2019.02); *B60L 53/34* (2019.02); *B60L 53/36* (2019.02); *H02J 7/0027* (2013.01); *H02J 7/0042* (2013.01); *H02J 7/022* (2013.01); *B60L 2200/18* (2013.01)

(58) Field of Classification Search
CPC ............................... B60L 538/18; B60L 53/34
USPC ........................................................ 320/109
See application file for complete search history.

(56) References Cited

U.S. PATENT DOCUMENTS

| | | | |
|---|---|---|---|
| 5,344,331 A | * | 9/1994 | Hoffman .............. H01R 13/453 |
| | | | 439/138 |
| 9,352,635 B1 | | 5/2016 | Schepmann et al. |
| 9,365,128 B2 | | 6/2016 | Sarkar et al. |
| 9,421,874 B2 | | 8/2016 | Warner et al. |
| 9,446,672 B2 | | 9/2016 | Hill et al. |
| 9,522,603 B1 | | 12/2016 | Allen |
| 9,550,428 B1 | | 1/2017 | Ertel |
| 9,809,122 B2 | | 11/2017 | McGrath et al. |
| 2009/0166103 A1 | | 7/2009 | Bowers et al. |

(Continued)

FOREIGN PATENT DOCUMENTS

| | | |
|---|---|---|
| GB | 2465045 A | 5/2010 |
| WO | 2018/232341 A1 | 12/2018 |

*Primary Examiner* — Suchin Parihar
(74) *Attorney, Agent, or Firm* — Greenberg Traurig, LLP

(57) ABSTRACT

A system for charging commercial electric vehicles, including buses and trucks. The system can include a charging station that outputs a supply of relatively high voltage electrical power, and a cable suspension post having a support post and a suspension arm. The suspension arm can be suspended away from the support post at a vertical height that is higher than the height of typical commercial vehicles. At least a portion of a charging cable is electrically coupled to the charging station and suspended from the suspension arm. A charging connector can be free-hanging from the suspended portion of the charging cable, and therefore be swingingly displaceable into electrical engagement with a mating connector of the vehicle. The suspension arm can be rotatably displaced relative to the support post and/or another portion of the suspension arm such that a vertical height and/or other position of the suspended arm can be adjusted.

19 Claims, 10 Drawing Sheets

(56) References Cited

U.S. PATENT DOCUMENTS

| | | | |
|---|---|---|---|
| 2012/0013300 A1* | 1/2012 | Prosser | B60L 11/1844 320/109 |
| 2012/0229085 A1 | 9/2012 | Lau | |
| 2013/0076902 A1* | 3/2013 | Gao | B60L 53/35 348/148 |
| 2013/0221918 A1 | 8/2013 | Hill et al. | |
| 2013/0257373 A1* | 10/2013 | Mallon, IV | F16L 3/16 248/65 |
| 2013/0338820 A1* | 12/2013 | Corbett | B60L 53/35 700/232 |
| 2014/0002019 A1 | 1/2014 | Park et al. | |
| 2015/0060611 A1* | 3/2015 | Takahashi | B60L 53/14 248/70 |
| 2017/0158074 A1 | 6/2017 | Buehs et al. | |
| 2018/0339660 A1* | 11/2018 | Tabor | A45C 13/02 |
| 2019/0366868 A1* | 12/2019 | Tseng | B60L 53/63 |
| 2020/0238844 A1* | 7/2020 | Grace | B60L 53/30 |
| 2020/0361331 A1* | 11/2020 | Shin | H02J 7/0045 |
| 2020/0369167 A1* | 11/2020 | Krucinski | B60L 53/305 |

* cited by examiner

SUSPENDED CHARGING CABLE SYSTEM FOR ELECTRIC VEHICLES

FIELD OF INVENTION

The present invention relates to high power charging stations for electric vehicles, and more particularly to high power charging stations for commercial vehicles that utilize a supported suspended charging cable(s) to accommodate single user attachment of the relatively heavy and stiff charging cable to an electric vehicle.

BACKGROUND

Electric vehicle power charging requirements can vary for different types of vehicles. For example, at least certain types of commercial vehicles, including certain buses and trucks that are at least partially powered by electric power, can utilize high power charging stations. In at least certain applications, such high power charging stations can deliver, for example, around 1 megawatt (MW) to around 8 MW of electrical power to an electric vehicle. However, the relatively large gauge cabling associated with the delivery of such levels of electrical power from a charging station to the electric vehicle can result in such cabling be relatively heavy and/or stiff.

For example, such cabling may need to accommodate the delivery of around 1 kilo-amp (kA) to around 5 kA of electrical power. Such power can be delivered by an approximately 22 millimeter (mm) to an approximately 50 mm diameter conductor. Yet, cables of such sizes can be relatively heavy and/or stiff. For example, a non-cooled cable that includes two conductors and associated cable insulation can have a mass of approximately 17 kilograms (kg)/meter (m) to approximately 50 kg/m, while similar cables having three conductors can have a mass of approximately 26 kg/m to approximately 75 kg/m. Further, the minimum length a charging cable may need to have to extend from a charging station to the electric vehicle, and also have a degree of flexibility that can accommodate at least some physical manipulation in the positioning of at least the cable, can be around 3 m to 5 m. Thus, the total weigh of a charging cable that can accommodate delivery of electrical power from a standard charging station to an electric vehicle can be around 56 kg to around 375 kg. Such weight and the associated stiffness of the cable can be difficult for many individuals to handle, let alone maneuver into position that can establish a chargeable electrical connection between the charging station and the electric vehicle.

BRIEF SUMMARY

An aspect of an embodiment of the present application is a system that can include a charging station that is configured to output a supply of electrical power, and a cable suspension post that can have a support post and a suspension arm. According to certain embodiments, the suspension arm can be coupled to the support post at one end of the suspension arm and at least vertically suspended away from the support post. The system can also include a charging cable that can be electrically coupled to the charging station, at least a portion of the charging cable being suspended from the suspension arm. Additionally, the system can include a charging connector that can be electrically coupled to, and free-hanging from, the suspended portion of the charging cable such that the charging connector can be swingingly displaceable with the suspended portion of the charging cable.

Another aspect of an embodiment of the present application is a system that can include a charging station that can be configured to output a supply of electrical power, and a cable suspension post that can have a support post and a suspension arm. The suspension arm can be suspended away from the support post. Further, according to certain embodiments, at least a suspended end of the suspension arm can be rotatably displaceable relative to at least one of the support post and another portion of the suspension arm. The system can further include a charging cable that can be electrically coupled to the charging station, at least a portion of the charging cable being suspended from the suspended end of the suspension arm. Additionally, the system can include a charging connector that is suspended from the suspension arm only by the suspended portion of the charging cable, the charging connector being electrically coupled to the charging cable.

Additionally, an aspect of an embodiment of the present application is a charging system for automatic alignment with, and electrical coupling to, a connector of an electric vehicle. The system can include a charging station that is configured to output a supply of electrical power, and a cable suspension post that can include a support post and a suspension arm, the suspension arm being suspended away from the support post. The system can also include a charging cable that can be electrically coupled to the charging station, at least a portion of the charging cable being downwardly suspended from the suspension arm. Additionally, the system can include, for example, a connection device having a charging connector, a recognition system, a controller, and a plurality of connection actuators. The charging connector can be electrically, and mechanically, coupled to an end of the suspended portion of the charging cable. According to certain embodiments, the recognition system can be configured to detect a location of one or more position indicators on at least a portion of the electric vehicle. The controller can be configured to receive, from the recognition system, information regarding the location of the one or more position indicators and to issue at least an actuation signal to one or more of the plurality of connection actuators to displace the charging connector into alignment, and/or engagement, with the connector of the electric vehicle.

These and other aspects of the present application will be better understood in view of the drawings and following detailed description.

BRIEF DESCRIPTION OF THE DRAWINGS

The description herein makes reference to the accompanying figures wherein like reference numerals refer to like parts throughout the several views.

Figures 1A, 1B:
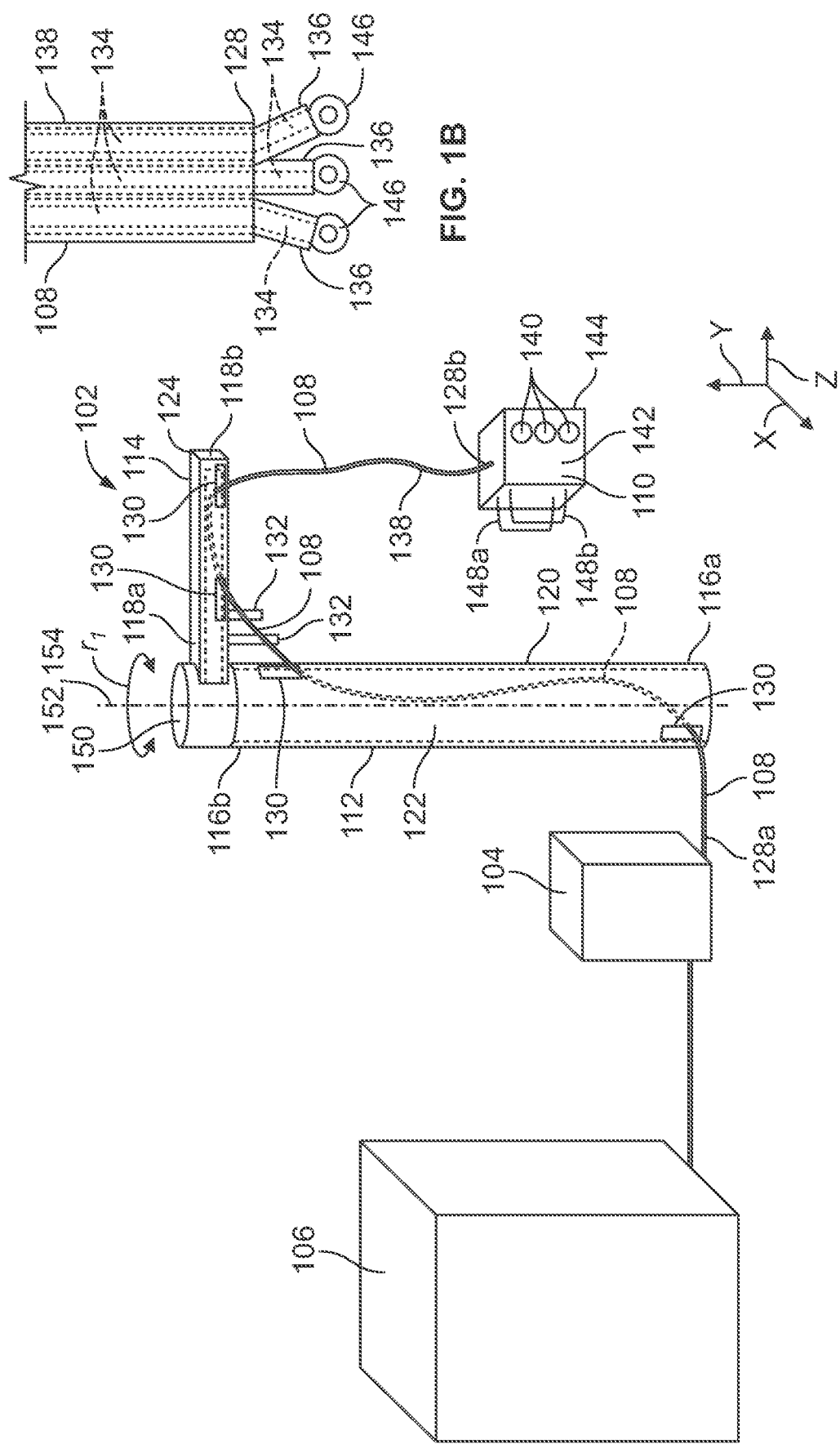
FIG. 1A illustrates a side view of a representation of an exemplary charging system that includes a cable suspension post according to an illustrated embodiment of the present application.
FIG. 1B illustrates a first end and/or a second end of an exemplary charging cable having a plurality of conductors encased in insulation and electrically coupled to eyebolt connectors.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1A illustrates a side view of a representation of an exemplary charging system 100 that includes a cable suspension post 102 according to an illustrated embodiment of the present application. As shown, the charging system 100 can include a charging station 104 that is electrically coupled to a power source 106, such as, for example, a utility power supply. According to the illustrated embodiment, the charging station 104 can be configured to output around 150 kilowatts (KW) to around 8 megawatts (MW), and more specifically, from around 1 MW to around 8 MW, of electrical power for charging a battery of an at least partially electrically powered vehicle, and in particular, a commercial electric vehicle, such as, for example, a bus or truck, including semi-trailer trucks, among other electric vehicles. Thus, while certain exemplary embodiments discussed herein are discussed with respect to high power charging stations that are adapted for delivering electrical power for certain types of commercial vehicles, embodiments of the subject application can also be adapted for use with a variety of other electrical charging vehicles and/or devices, including, but not limited to, charging stations that delivery lower levels of electrical power.

According to certain embodiments, the charging station 104 can include an AC/DC power converter so that the charging station 104 outputs DC power. Further, the charging station 104 can include a controller that can be used to at least assist in controlling when the charging station 104 is to output electrical power. For example, according to certain embodiments, the charging station 104 can be configured to commence a supply of electrical power for charging a battery(ies) of an electric vehicle upon detection by a controller of the charging station 104 of an electrical connection being established between a charging connector 110 of the charging system 100 and a mating connector of the electric vehicle, and/or upon operation by a user of an input device of the charging station 104, such as, for example, an on/off switch or button.

The cable suspension post 102 of the charging system 100 can house at least a portion of the electrical conductors and/or charging cable(s) 108 that are used in the delivery of electrical power from the charging station 104 to the charging connector 110. Additionally, as discussed below, the cable suspension post 102 can also be configured such that a least a portion of a charging cable 108 is generally downwardly suspended from the cable suspension post 102 by a length that accommodates engagement of the charging connector 110 with the mating connector of the vehicle, while also preventing the charging connector 110 and charging cable 108 from contacting the adjacent ground or ground surface.

According to the illustrated embodiment, the cable suspension post 102 can include a support post 112 and a suspension arm 114. The support post 112 and suspension arm 114 can be constructed from a variety of materials, including, for example, galvanized steel, among other materials. Additionally, the support post 112 can extend from a first end 116a to a second end 116b of the support post 112 such that the suspension arm 114, which is coupled to the support post 112, is at an elevated position above ground level that can accommodate the positioning of a commercial electric vehicle below at least a portion of the suspension arm 114. Thus, for example, according to certain embodiments, the support post 112 can have a vertical length between the opposing first and second ends 116a, 116b of the support post 112 that is similar to, if not greater than, a height typically associated with commercial vehicles. For example, according to certain embodiments, the support post 112 can have a vertical length, or height, that is at least, if not greater than, around 4 meters (m) to around 5 m. Further, the first end 116a of the support post 112 can be securely mounted to the ground, such as, for example, being mounted, or otherwise coupled, to a concrete foundation or pad that is positioned on and/or extends into the ground. The second end 116b of the support post 112 can be at least mechanically coupled to a first end 118a of the suspension arm 114. The suspension arm 114 can thus extend in an at least generally outwardly horizontal direction away from the support post 112 and to a second end 118b of the suspension arm 114. Thus, according to certain embodiments, the suspension arm 114 may have a generally cantilever configuration in that only one end, namely the first end 118a, and not the second end 118b, of the suspension arm 114 is mounted or fixed to another structure, such as, for example, the support post 112. According to certain embodiments, at least a portion of the charging cable 108 can be generally downwardly suspended at, or in the general vicinity of, the second end 118b of the suspension arm 114.

As shown in FIG. 1A, according to certain embodiments, the support post 112 can include an outer wall 120 that generally defines an inner pathway 122 within the support post 112. The inner pathway 122 can be sized to provide a pathway for at least a portion of the electrical conductors and/or charging cable(s) 108 that are used in the delivery of electrical power from the charging station 104 to the charging connector 110. Similarly, the suspension arm 114 can also include an outer wall 124 that defines at least a portion of an interior passageway 126 within the suspension arm 114. The interior passageway 126 of the suspension arm 114 can be also sized and positioned to house at least another portion of the electrical conductors and/or charging cable(s) 108 that are used in the delivery of electrical power to the charging connector 110. For example, according to the exemplary embodiment depicted in FIG. 1A, the charging cable 108 can include a first end 128a that is electrically coupled to the charging station 104, and an opposing second end 128b that is electrically coupled to the charging connector 110. A portion of the charging cable 108 in the general vicinity of the first end 128a of the charging cable 108 can enter into the inner pathway 122 of the support post 112 and extend in a generally upward vertical direction along a portion of the support post 112. According to the embodiment depicted in FIG. 1A, the charging cable 108 can pass through an opening 130 in the outer wall 120 of the support post 112, and extend generally upwardly and outwardly until passing through a similar opening in the outer wall 124 of the suspension arm 114. According to certain embodiments, a portion of the charging cable 108 that is exposed outside of the cable suspension post 102 as the charging cable 108 extends between the support post 112 and the suspension arm 114 can be supported by one or more hangers or brackets 132. Such hangers or brackets 132 can, for example, extend from the suspension arm 114 and extend around at least a portion of an outer periphery of the charging cable 108. The charging cable 108 can then extend through another opening at, or generally around, the second end 118b of the suspension arm 114, such that the charging cable 108 can be suspended in a generally downwardly vertical direction from the suspension arm 114. The suspended portion of the charging cable 108 can terminate at an electrical, and possibly mechanical, connection between the charging cable 108 and the charging connector 110 such that the charging connector 100 is also suspended from the suspension arm 114. Additionally, the opening in the suspension arm 114 from which a portion of the charging cable 108 extends and is suspended from can, according to certain embodiments, provide a generally singular pivot and/or rotation point about which the suspended charging cable 108, and attached charging connector 110, can be swingingly displaced in a variety of directions and combination of directions relative to at least the suspension arm 114, as discussed below. Moreover, according to certain embodiments, the suspended portion of the charging cable 108, as well as the connected charging connector 110, are free hanging from the suspension arm 114, and further can generally be omnidirectional.

Alternatively, rather than extending through an inner pathway 122 within the support post 112 and/or the interior passageway 126 of the suspension arm 114, according to other embodiments, the charging cable 108 or other associated conductor(s) can be secured to an outer portion of the support post 112 and/or suspension arm 114, such as, for example, via one more straps or ties. Alternatively, or additionally, at least a portion of the charging cable 108 or other associated conductor(s) can be covered along at least a portion of the support post 112 and/or suspension arm 114 by one or more panels or other covers that can be selectively removed and/or opened to expose at least a portion of the charging cable 108 and/or associated electrical conductor(s) and/or connectors.

A variety of different types and/or sizes of cables can be utilized for the charging cable 108. For example, the charging cable 108 can be sized to accommodate the delivery of around 1 kilo-amp (kA) to around 5 kA of electrical power. Further, as indicated by at least FIG. 1B, which can represent either or both of the first and second ends 128a, 128b of the charging cable 108, the charging cable 108 can include two or more conductors 134 that can be constructed from a variety of materials, including, for example, copper or aluminum, among other materials and alloys. Further, each conductor 134 can be encased in an insulation material 136, such as, for example, a vulcanized rubber, which can, according to certain embodiments, be encased within one or more semiconducting layers. Additionally, the conductors 134 can also be encased within an outer insulating layer, which can comprise another layer of vulcanized rubber, and/or encased in an outer insulating coat 138, which can at least assist in housing each of the conductors 134 and their associated insulating material 136 and semi-conductive layers in a single charging cable 108. Thus, according to certain embodiments, the charging cable 108 can include two conductors 134, such as, for example, a DC positive conductor and a DC negative conductor, and their associated insulating materials 136 and semi-conductive layers, in a single charging cable 108. Alternatively, as shown in at least FIG. 1B, according to other embodiments, the charging cable 108 can include three conductors 134 and associated insulating materials 136 and semi-conductive layers in a single charging cable 108, such as, for example, a DC positive conductor, a DC negative conductor, and a protective earth (PE) conductor.

At least the suspension arm 114 is sized to accommodate the weight associated with suspension of the charging cable 108 from a location at, or in the general vicinity of, the second end 118b of the suspension arm 114, as well as the weight of the associated charging connector 110 that is coupled to the second end 128b of the charging cable 108. Such a configuration of the suspension arm 114 can be based, at least in part, on the size and weight of the charging cable 108, the associated height of the cable suspension post 102, the weight of the suspension arm 114, and the length that the suspension arm 114 extends from the support post 112. Further, as previously mentioned, a non-cooled charging cable 108 that includes two conductors 134 and associated cable insulation can have a mass of approximately 17 kilograms (kg)/meter (m) to approximately 50 kg/m, while a similar charging cable 108 having three conductors 134 can have a mass of approximately 26 kg/m to approximately 75 kg/m. As the suspension arm 114 can, according to certain embodiments, be positioned about 4 m to about 5 m above the ground level at which a vehicle to be electrically charged by the charging system 100 can be parked, the charging cable 108 can have an length of about 3 m to about 4 m. Such a length, which can result in at least the suspended portion of the charging cable 108 having a weight of around 56 kg to around 375 kg, can accommodate a degree of adjustments in the positioning and/or orientation of the charging cable 108 as the charging connector 110 is displaced into alignment and engagement with the mating connector of the electrical vehicle, while also preventing the charging connector 110 from contacting the ground.

The charging connector 110 can include one or more electrical connectors 140 that are configured for engagement with mating electrical connectors of a charging system of the electric vehicle. The electrical connectors 140 can have a variety of different shapes, sizes, and arrangements, including, for example, being male pins or female sleeves that are sized to engage the mating female sleeve or male pin, respectively, of the electrical connector of the vehicle charging system. According to the illustrated embodiment, the number of electrical connectors 140 of the charging connector 110 can correspond to the number or conductors 134 of the charging cable 108. For example, the embodiment illustrated in FIG. 1A depicts three electrical connectors 140 that extend through, or from, at least one side 142 of a housing 144 of the charging connector 110, each electrical connector 140 being electrically coupled to one conductor 134 of the charging cable 108. For example, according to certain embodiments, each conductor 134 at the second end 128b of the charging cable 108 can include an eyebolt connector 146 (FIG. 1B) that is crimped, or otherwise securely attached, onto an end portion of an associated conductor 134. Such eyebolt connectors 146 can be secured to a bolt or other projection of the charging connector 110 that is in electrical communication with an electrical connector 140 of the charging connector 110 such that an electrical connection can be established between the conductor 134 of the charging cable 108 and the associated electrical connector 140 of the charging connector 110. Such engagement of the eyebolt connector 146 with the bolt or projection of the charging connector 110 can be secured via use of a nut or other mechanical fastener that can matingly engage the bolt or other projection in a manner that can be used, at least in part, to retain the eyebolt connector 146 in a mating engagement with the bolt or projection of the charging connector 110. Further, in view of the size of the conductors 134 of the charging cable 108, and thus the overall size of the charging cable 108, such a connection between the eyebolt connectors 146 of the conductors 134 of the charging cable 108 and the bolt or projection of the charging connector 110 can be utilized to mechanically secure the charging cable 108 to the charging connector 110, and moreover, securely suspend the charging connector 110 from the charging cable 108.

According to certain embodiments, the first end 118a of the suspension arm 114 can be mechanically coupled to the support post 112 via a generally static connection. For example, the suspension arm 114 can be mechanically coupled to the support post 112 via one or more mechanical fasteners, including, but not limited to, bolts, and/or via a welded connection, as well as a combination thereof, such that the suspension arm 114 remains in a generally static position relative to the support post 112. According to such embodiments, movement of the charging connector 110, such as, for example, movement associated with aligning the charging connector 110 with a mating connector of an electric vehicle, is primarily attained by a user using their own physical power or force to adjust the positioning of the charging connector 110. Thus, according to such an embodiment, the charging cable 108 can have a sufficient length to accommodate at least some movement of the charging connector 110 as the user displaces, such as swings, the charging connector 110 in a direction toward/away from the adjacent side of the electric vehicle, toward one of the front and rear end of the vehicle, in a vertical direction, and/or a combination thereof. Moreover, by utilizing the suspended charging cable 108, the suspended portion of the charging cable 108, as well as the charging connector 110, can be swingingly displaced in a variety of directions, including back and forth and side to side, as well various combinations thereof and directions there-between. Moreover, such swinging displacement can accommodate displacement of the charging connector 110 and suspended portion of the charging cable 108 in generally circular, non-circular, linear, and non-linear directions, as well as movement simultaneously along a plurality of axes, including simultaneously along at three axes of movement. As shown in at least FIG. 1A, according to certain embodiments, such movement of the charging connector 110 by the user can be facilitated by the inclusion of one or more handles 148a, 148b on the housing 140 of the charging connector 110, the handles 148a, 148b providing a location at which the user can exert forces on the charging connector 110 at least as the user displaces the charging connector 110 into alignment with the mating connector of the electric vehicle.

Alternatively, according to other embodiments, the cable suspension post 102 can include one or more joints that can accommodate displacement of at least a portion of the suspension arm 114 relative to the support post 112 and/or relative to other portions of the suspension arm 114. For example, referencing FIG. 1A, according to certain embodiments, the suspension arm 114 can be coupled to the support post 112 by a post joint 150 in manner that can accommodate rotational or pivotal movement of the suspension arm 114 about a central axis 154 of the post joint 150 (as indicated by the rotational or pivotal direction "$r_1$" in at least FIG. 1A). The central axis 154 of the post joint 150 may or may not be the same as a central longitudinal axis 154 of the support post 112 that extends from the first and second ends 116a, 116b of the support post 112. Such rotational coupling of the suspension arm 114 to the support post 112 via the post joint 150 can be attained in a variety of different manners. For example, according to the illustrated embodiment, the post joint 150 can be in the form of a cap that is secured connected to the suspension arm 114 and rotatably connected to the support post 112, such as, for example, via one or more bearings 145 (FIG. 3) and/or a gearing system, including, for example, a pinion gear that is coupled to the suspension arm 114 that traverses around an internal tooth gear that is connected to the support post 112 or is rotated about a planetary gear system, among other means of establishing a rotatable coupling of the suspension arm 114 to the support post 112.

According to such an embodiment, displacement of the charging connector 110 via a force(s) applied by the user to the charging connector 110 and/or charging cable 108 can cause at least the suspended portion of the charging cable 108 to exert a force against the suspension arm 114 in a manner that facilitates rotation of the suspension arm 114 about the support post 112. Further, as shown by at least FIGS. 1A, 4, and 5, such rotation can at least assist the user in adjusting the location at which the charging connector 110 generally extends in a first direction toward an adjacent side 157 of the electric vehicle 156 (generally along the indicated "x" axis), as well as adjusting a position of the charging connector 110 in a second general direction relative to at least the front end 158 and rear end 160 of the vehicle 156 (generally along the indicated "z" axis).

Figure 2:
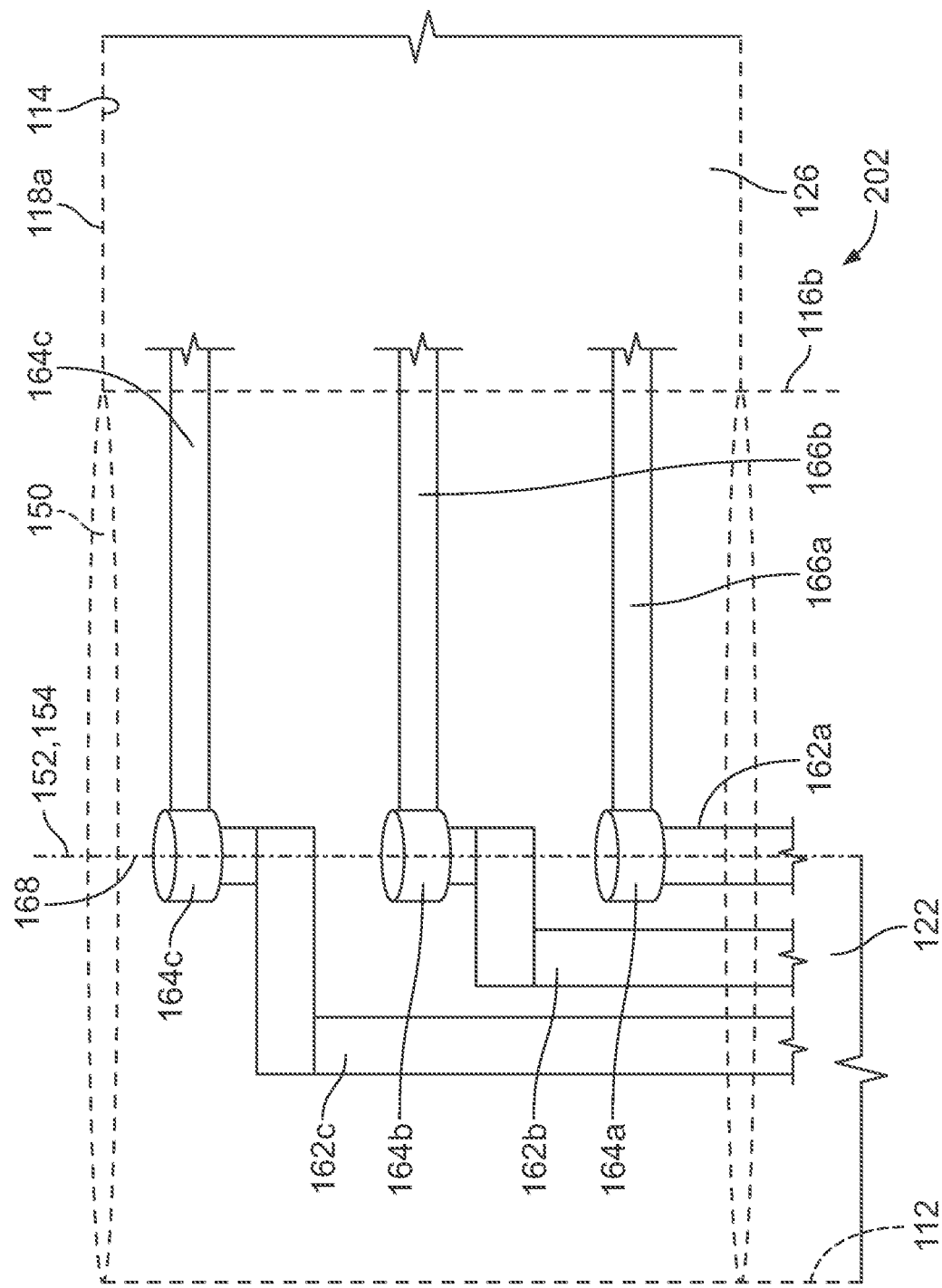
FIG. 2 illustrates a side perspective view of a portion of a plurality of rotary electrical connectors housed within a portion of a cable suspension post.
Figure 3:
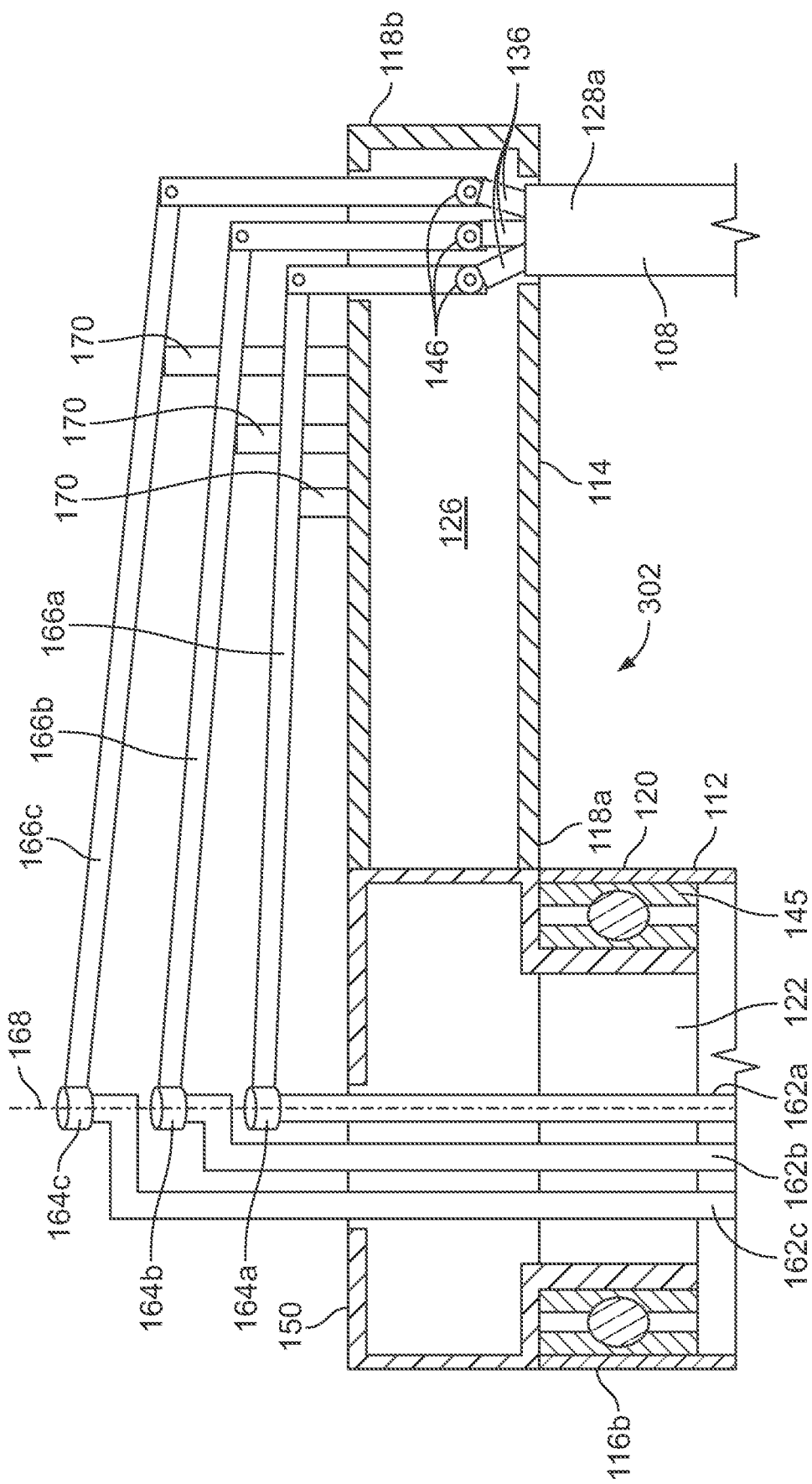
FIG. 3 illustrates a side perspective view of a portion of a plurality of rotary electrical connectors extending to an external position about a cable suspension post.

As shown in FIGS. 2 and 3, according to certain embodiments, the electrical connection between the charging station 104 and the charging cable 108 can be configured to accommodate such rotational movement of the suspension arm 114 relative to the support post 112 and about the post joint 150. For example, while FIG. 1A illustrates an embodiment in which the charging cable 108 generally extends along and through the cable suspension post 102, according to other embodiments, other electrical conductors and/or connections that are electrically coupled to the charging station 104 and the charging cable 108 can extend through at least some, if not all, of the cable suspension post 102. For example, FIG. 2 illustrates an exemplary embodiment in which three electrical post conductors or buses 162a-c that are directly or indirectly electrically coupled to the charging station 104 each extend through at least a portion of the support post 112 of a cable suspension post 202, and to or around the post joint 150. As also show, according to the illustrated embodiment, an electrically conductive sleeve 164a-c is rotatably coupled to each of the three post conductors 162a-c at, or in the general vicinity of, the post joint 150. Further, as indicated by at least FIG. 2, the sleeves 164a-c are mounted at positions on the post conductors 162a-c such that each of the sleeves 164a-c are aligned along a common axis of rotation 168, which may or may not be the same as the central axis 152 of the post joint 150 and/or the central longitudinal axis 154 of the support post 112. Further, arm conductors or buses 166a-c, which are directly or indirectly coupled to the charging cable 108, can extend from each of the sleeves 164a-c and into the suspension arm 114. Thus, the arm conductors 166a-c can each be in electrical communication with a post conductor 162a-c via an associated sleeve 164a-c. Moreover, according to such an embodiment, as the suspension arm 114 is rotated relative to the support post 112 at the post joint 150, the sleeves 164a-c that are connected to the arm conductors 166a-c are rotated about the associated post conductors 162a-c in a manner that maintains the electrical connection between the post conductors 162a-c and the arm conductors 166a-c.

While FIG. 2 illustrates the post conductors 162a-c, sleeves 164a-c, and arm conductors 166a-c being housed within an internal portion of the cable suspension post 202, as shown in FIG. 3, at least a portion of these components, as well as the associated connection with the sleeves 164a-c, can be external to the cable suspension post 302. Moreover, as shown in FIG. 3, according to certain embodiments, the post conductors 162a-c can extend to a location outside of the cable suspension post 302, including, for example, to a location above the post joint 150. Similar to the sleeve 164a-c arrangement shown in FIG. 2, the sleeves 164a-c in FIG. 3 are also arranged such that the sleeves 164a-c share a common axis of rotation 168, which, again, may, or may not, be the same as the central axis 152 of the post joint 150 and/or the central longitudinal axis of the support post 112. As shown FIG. 3, according to certain embodiments, the arm conductors 166a-c can be supported, at least in part, by a support mount(s) 170 that can be secured to the to the cable suspension post 302, including, for example, the suspension arm 114, among other manners of support.

FIG. 3 further illustrates ends of the arm conductors 166a-c connected to eyebolt connectors 146 that are electrically coupled to the conductors 134 (FIG. 2) at a first end 128a of the charging cable 108. Such eyebolt connectors 146 can be secured to a bolt or other projection that is in electrical communication with the associated arm conductor 166a-c such that an electrical connection can be established between the arm conductor 166a-c and a connected conductor 134 of the charging cable 108. Additionally, such engagement of the eyebolt connector 146 with the bolt or projection of the arm conductor 166a-c can be secured via use of a nut or other mechanical fastener that can matingly engage the bolt or other projection in a manner that can be used, at least in part, to retain the eyebolt connector 146 in a mating engagement with the bolt or projection. Thus, in addition to providing an electrical connection between the arm conductors 166a-c and the conductors 134 of the charging cable 108, such a connection can also be utilized to mechanically secure the charging cable 108 to the cable suspension post 302, and moreover, to the suspension arm 114, in a manner that accommodate suspension of the charging cable 108 from the suspension arm 114. Additionally, the eyebolt connectors 146 can provide a mechanical connection of the suspended charging cable 108 at generally a single location along the suspension arm 114. Such a generally singular point of contact between the charging cable 108 and the suspension arm 114 can provide a pivot and/or rotation point about which the suspended charging cable 108, and attached charging connector 110, can be swingingly displaced in a variety of directions and combination of directions. While such a connection of the charging cable 108 is shown in FIG. 3, a similar connection of the first end 128a of the charging cable 108 to the cable suspension post 302 can be utilized by a variety of other embodiments of the present application, including, but not limited to, at least the embodiment of the cable suspension post 202 that is illustrated in FIG. 2.

As shown in at least FIGS. 4-6 and 8, according to certain embodiments, in addition to, or in lieu of, the above-discussed post joint 150, the cable suspension post 402, 502 can include one or more arm joints 172. At least one arm joint 172 can be configured to adjust at least a vertical position of the second end 118b of the suspension arm 114 (as indicated by the "y" axis in FIGS. 4, 5, and 6). For example, according to certain embodiments, the arm joint 172 can comprise a hinged or pinned connection or ball joint that can accommodate rotational or pivotal displacement of a portion of the suspension arm 114 (generally in the "$r_2$" direction shown in FIGS. 5, 6, and 8) relative to the support post 112 and/or relative to another portion of the suspension arm 114.

Figure 4:
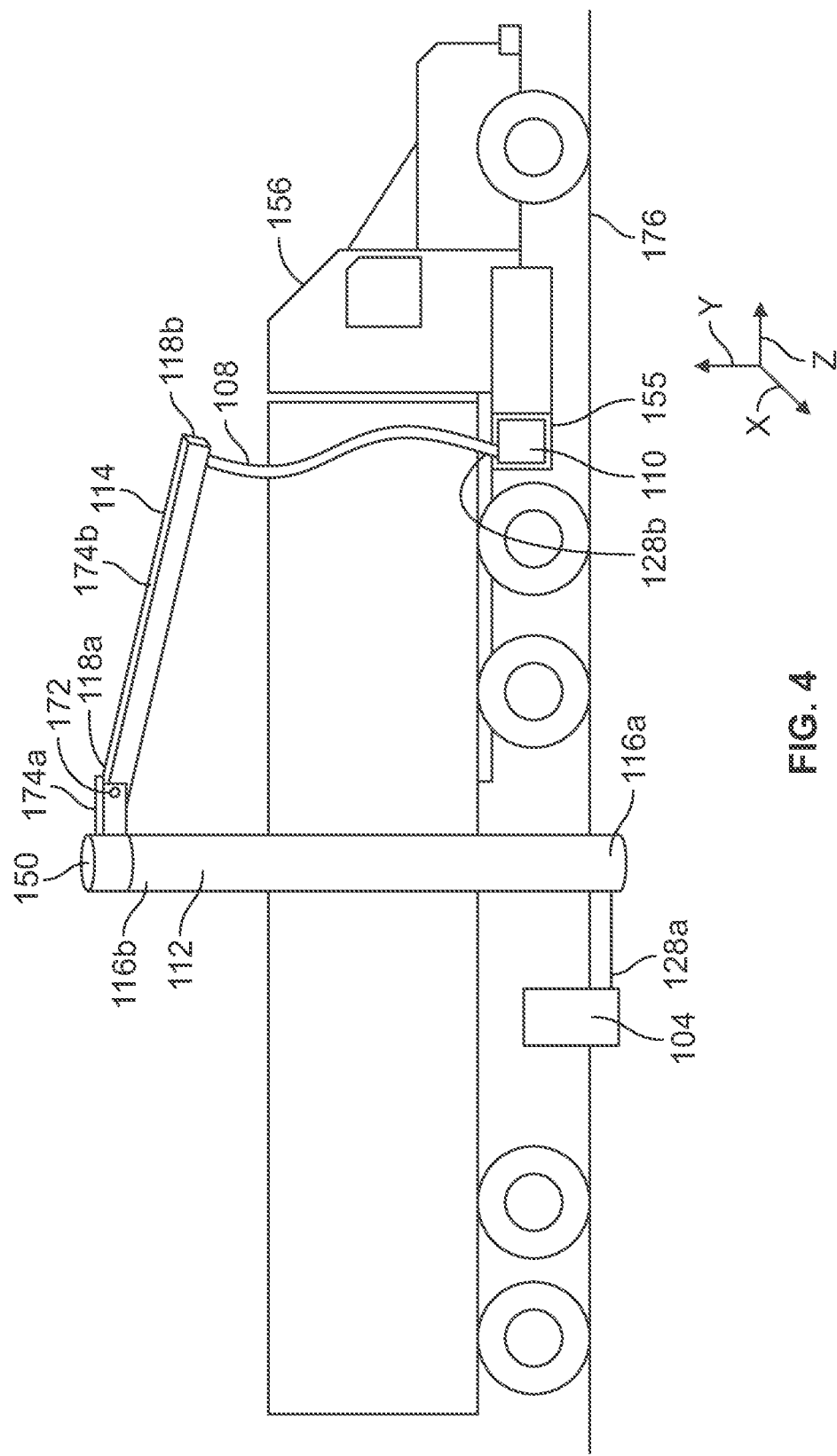
FIG. 4 illustrates a side view of a representation of an exemplary charging system that includes a cable suspension post according to an illustrated embodiment of the present application, and which is positioned adjacent to a side portion of a commercial vehicle.
Figure 5:
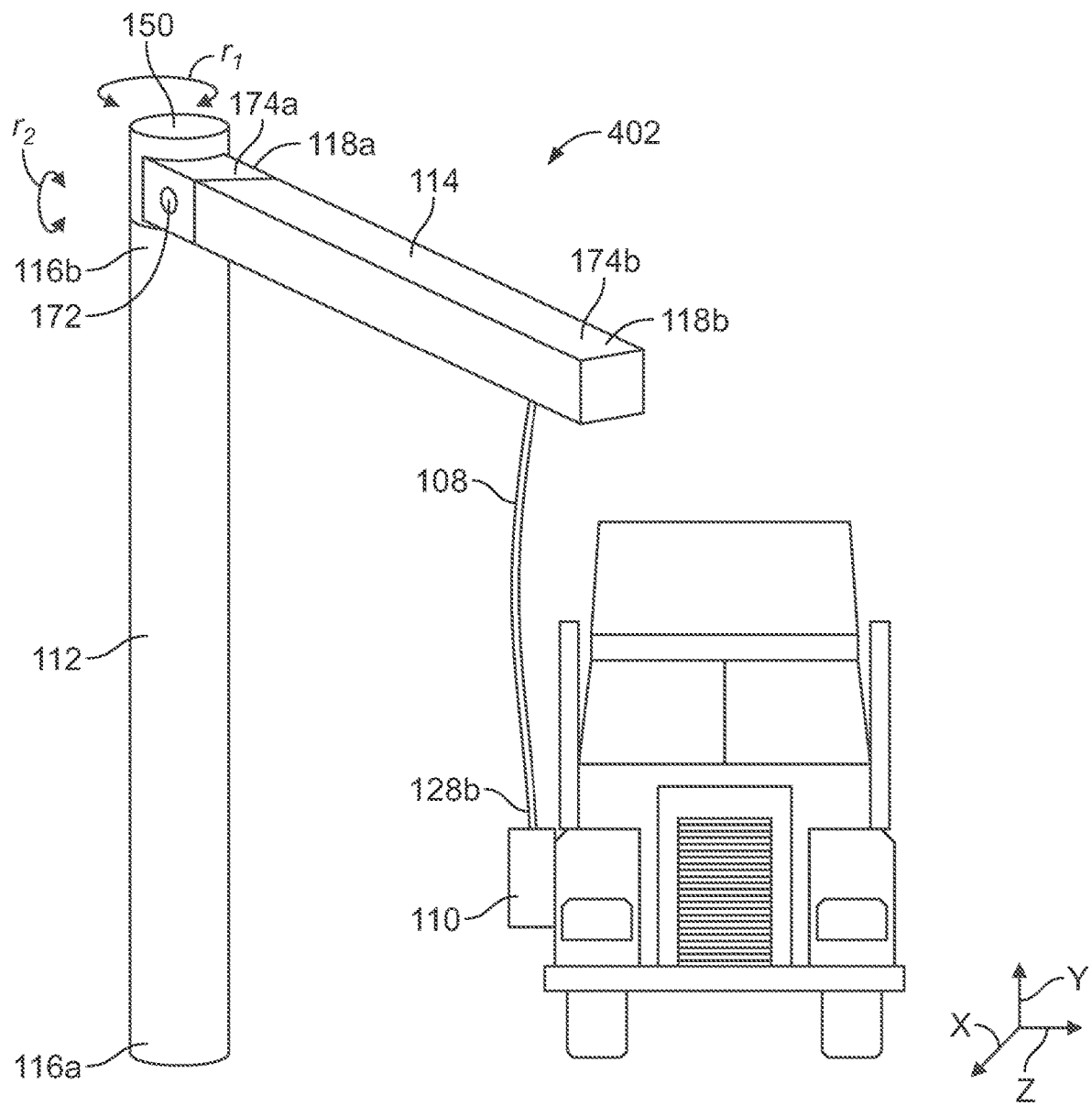
FIG. 5 illustrates a front view of a portion of the charging system shown in FIG. 5.
Figure 6:
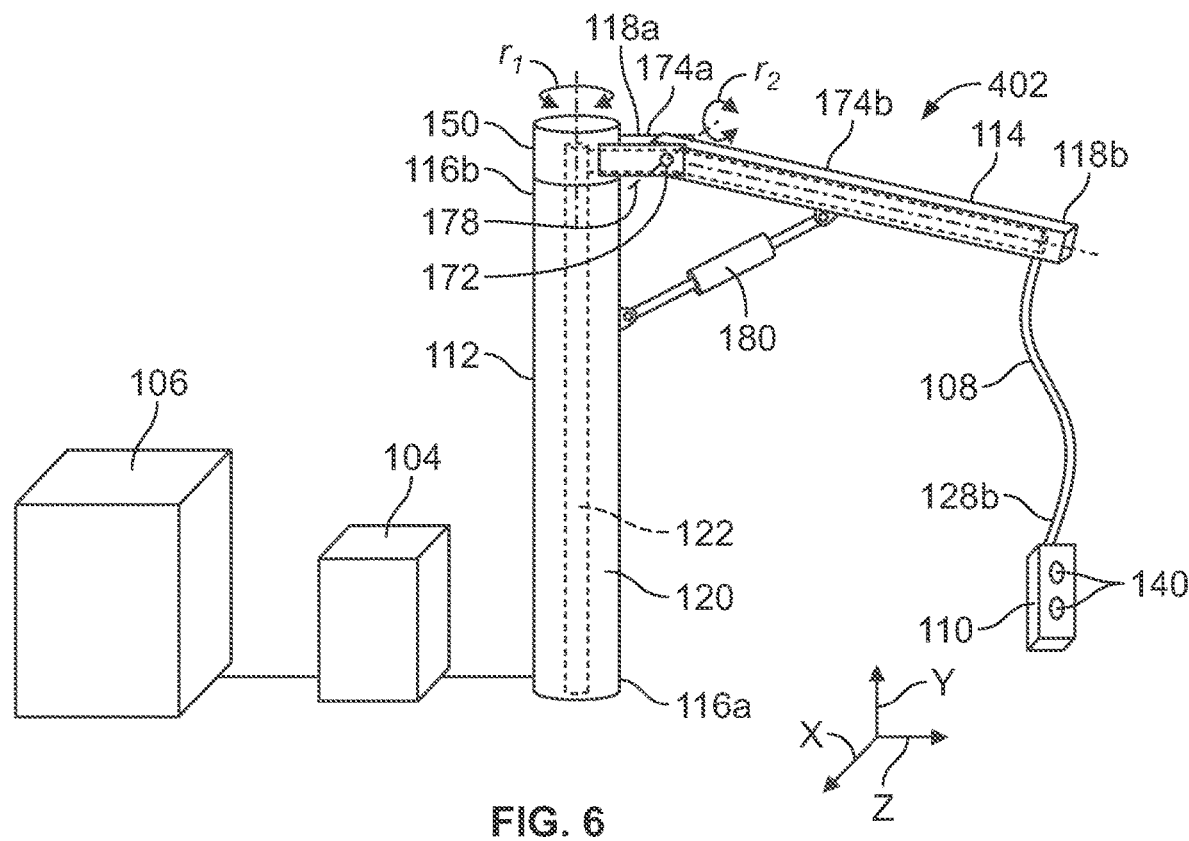
FIG. 6 illustrates a side view of a representation of the exemplary charging system shown in FIG. 4 that further includes an exemplary biasing element.

For example, as shown in at least FIGS. 4-6, the suspension arm 114 can comprise a first arm segment 174a and a second arm segment 174b, the second arm segment 174b being pivotally coupled to the first arm segment 174a by the arm joint 172, such as, for example, a pin or a ball joint. According to such an embodiment, the first arm segment 174a can include the first end 118a of the suspension arm 114 such that the first arm segment 174a is coupled to the support post 112 and/or the post joint 150, while the second arm segment 174b can be pivotally coupled to the first arm segment 174a and extend to the second end 118b of the suspension arm 114. According to certain embodiments, the first arm segment 174a can generally maintain a vertical position of the suspension arm 114 relative to at least the ground, while at least the vertical position, if not other positions or orientations, of at least the second end 118b of the suspension arm 114 can be adjusted by at least pivotal displacement of the second arm segment 174b about the arm joint 172 in one or more directions. Such displacement of the second end 118b of the suspension arm 114 can result in at least an adjustment in the vertical position of the charging connector 110 that is suspended from the suspension arm 114 by the charging cable 108, particularly as the charging connector 110 is suspended by the charging cable 108, or portion thereof, that is suspended from, or in the general vicinity of, the second end 118b of the suspension arm 114. Further, based at least on the position of the suspension arm 114 relative to the indicated "x" and "z" axes, such pivotal displacement of the second segment arm 174b about the arm joint 172 can also, to at least degree, adjust the location of the charging connector 110 along at least one, if not both, the indicated "x" axis and "z" axis, particularly if the arm joint 172 is a ball joint.

Figure 8:
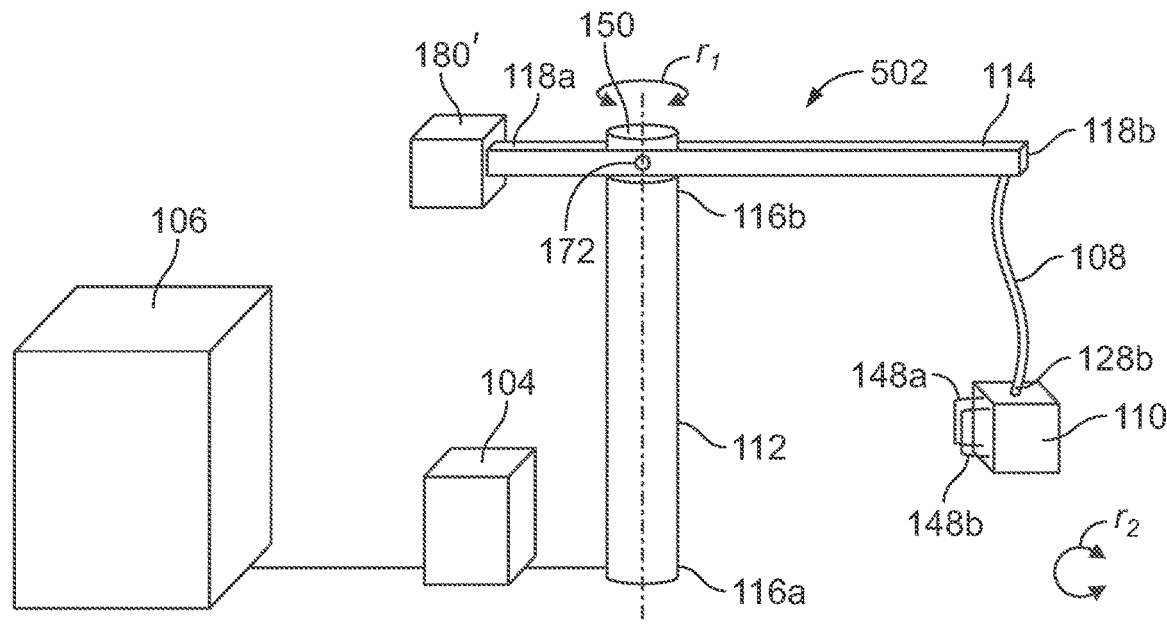
FIG. 8 illustrates a side view of a representation of an exemplary charging system that includes a biasing element in the form of a counterbalance that is positioned at an end of a suspension arm of a cable suspension post.

Further, as shown by at least FIG. 8, according to certain embodiments, rather than having separate arm segments 174a, 174b, the suspension arm 114 can pivotally coupled to the post joint 150 and/or the support post 112 such that the entire suspension arm 114 can pivot or rotate in a direction that at least adjusts the vertical distance between the second end 118b of the suspension arm 114 and the ground 176 (FIG. 4) upon which the electric vehicle 156 is positioned. For example, as shown by the embodiment depicted in FIG. 8, the arm joint 172 can extend through the post joint 150, as well as though opposing sides of the suspension arm 114. Further, according to certain embodiments, the central axis 178 of the arm joint 172 is non-parallel to the central axis 152 of the post joint 150, including, for example, but not limited to, the central axis 178 of the arm joint 172 being generally perpendicular to the central axis 152 of the post joint 150. Additionally, the central axis 178 of the arm joint 172 can be linearly offset from, or, alternatively, intersect with, the central axis 152 of the post joint 150.

Referencing FIGS. 6 and 8, according to certain embodiments, the cable suspension post 402, 502 can include one or more biasing elements 180, 180' that are configured to bias the suspension arm 114 to a particular location and/or orientation. For example, as shown in FIG. 6, according to certain embodiments, the biasing element 180 can be a spring, a mechanical damper, or a hydraulic damper, among other types of biasing elements. As shown in FIG. 6, according to certain embodiments, the biasing element 180 can be coupled to the support post 112 and a portion of the suspension arm 114 that is displaceable about the arm joint 172, including, for example, being displaceable in at least the vertical direction. Additionally, according to certain embodiments, the biasing element 180 can be configured to control the speed at which the suspension arm 114, or portion thereof, can be displaced in at least the vertical direction. Further, as shown in FIG. 8, according to certain embodiments, the biasing element 180' can be a counter balancing weight that is positioned along the suspension arm 114 such that the biasing element 180' and the second end 118b of the suspension arm 114 are at opposing sides of the central axis 178 of the arm joint 172. Therefore, according to certain embodiments, the biasing element 180, 180' can be utilized to raise or lower the vertical distance between the second end 128b of the charging cable 108 and the ground, and thus at least attempt to maintain a particular vertical distance between the charging connector 110 and the ground 176. Additionally, the charging cable 108 can have sufficient stiffness such that, as a user raises the charging connector 110 in a generally upwardly direction, the stiffness of the charging cable 108 can result in the charging cable 108 providing a force that pushes, and displaces, the suspension arm 114 in a generally upwardly direction.

Figure 7:
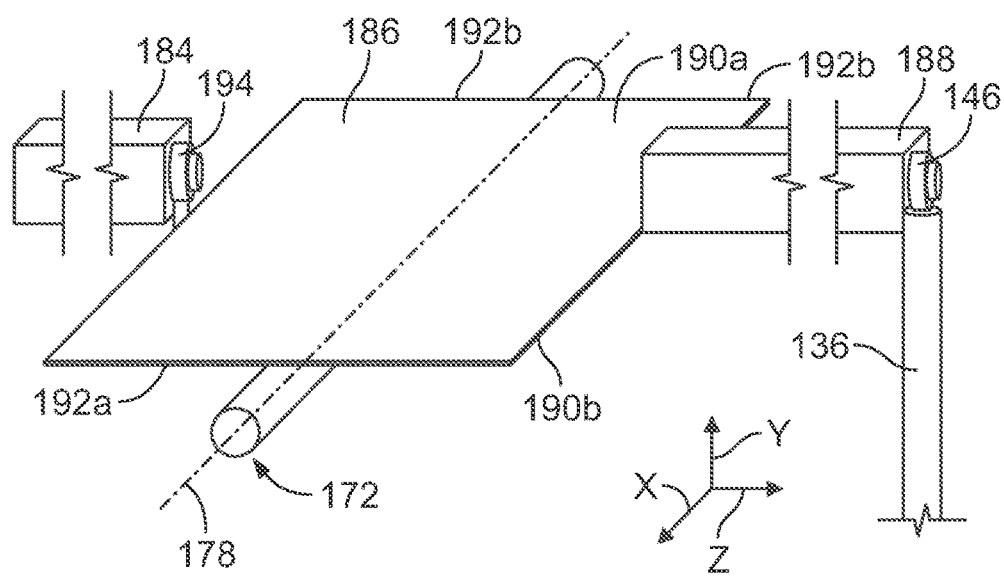
FIG. 7 illustrates a representation of a portion of an exemplary conductor assembly that is positioned at a location that extends across an arm joint of a cable suspension post.

The electrical conductors, contacts, and/or charging cable(s) 108 that extend through, along, and/or above the suspension arm 114 that are utilized in delivering electrical power to the charging connector 110 can have a variety of different configurations to accommodate displacement of at least a portion of the suspension arm 114 along the arm joint 172. For example, as shown in FIG. 7, according to certain embodiments, such conductors 182 can include a first conductor or bus 184, a ribbon conductor 186, and a second conductor or bus 188. The first and second conductors 184, 188 can be positioned on opposing sides of the arm joint 172, such as, for example, on either side of, and offset from, the central axis 178 of the arm joint 172. The ribbon conductor 186 can be positioned to provide an electrical connection between the first and second conductors 184, 188. Additionally, the ribbon conductor 186 can be positioned to extend across the arm joint 172 such that the ribbon conductor 186 is bent or otherwise deformed or deflected by displacement of at least a portion of the suspension arm 114 at the arm joint 172. According to certain embodiments, such bending of the ribbon conductor 186 can be accommodated by the ribbon conductor 186 having a relatively small thickness between opposing upper and lower surfaces 190a, 190b of the ribbon conductor 186 in the general direction of the vertical "y" axis, and in particular when compared to a width of the ribbon conductor between opposing sides 192a, 192b of the ribbon conductor 186 in the general direction of the at least the "x" axis, as indicated in FIG. 7. For example, according to certain embodiments, the vertical width of the ribbon conductor 186 between opposing upper and lower surfaces 190a, 190b of the ribbon conductor 186 can be about 10 times smaller than the width of the ribbon conductor 186 between the opposing sides 192a, 192b of the ribbon conductor 186.

Additionally, the ribbon conductor 186 can be electrically coupled to the first and second conductors 184, 188 in a variety of manners, including, for example, via one or more eyebolt connectors 194. Further, similar to the embodiment depicted in FIG. 3, each conductor 134 at the first end 128a of the charging cable 108 can be electrically coupled to the second conductor 188, as well as mechanically coupled to the suspension arm 114, by an eyebolt connector 146. While FIG. 7 illustrates electrical connectors, including a single bending ribbon conductor 186, for a single conductor 134 of the charging cable 108, similar conductors 184, 186, 188 at or around the arm joint 172 can also be utilized for electrical connections with each of the other conductors 134 of the charging cable 108.

According to the embodiments depicted in FIGS. 4-6 and 8, by exerting a force against the charging connector 110, such as, for example, a pushing or pulling force on the handles 148a, 148b of the charging connector 110, the user can cause the charging cable 108 to exert a force against the suspension arm 114 that facilitates at least rotational displacement of the suspension arm 114 about at least the post joint 150 in the indicated "$r_1$" direction, and thus displace the charging cable 108 and charging connector 110 generally in a direction toward or away from an adjacent side 157 of the vehicle 156 (FIG. 5), as well in a direction toward one of the front and rear ends 158, 160 of the vehicle (FIG. 4). Further, by pushing or pulling the charging connector 110 either upwardly or downwardly, at least the vertical distance between the second end 118b of the suspension arm 114 and the ground can be adjusted, thereby adjusting at least the distance between the second end 128b of the charging cable 108 (and the charging connector 110) and the ground 174.

Figure 9:
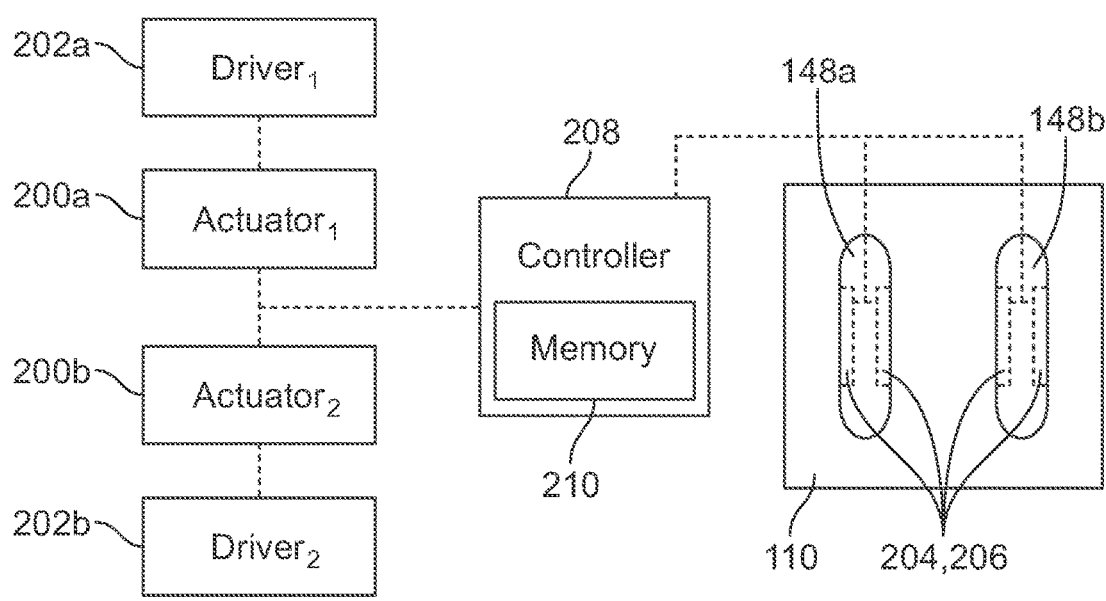
FIG. 9 illustrates a block diagram of a force sensor system utilized to facilitate movement of at least a portion of a cable suspension post at least in connection with positioning a connector of the charging system into electrical engagement with a mating connector receptacle.

According to other embodiments, rather than utilizing the physical force of a user to facilitate displacement of the charging connector 110, including displacement about one or both of the post joint 150 and arm joint 172, the cable suspension post 102, 202, 302, 402, 502 can instead utilize actuators 200a, 200b to facilitate such displacement. For example, referencing FIGS. 9 and 10, according to certain embodiments the user can engage an input device 204 that can either detect, or be responsive to, actions provided by the user that indicate one or more directions that the user desires to displace charging connector 110. A variety of input devices 204 can be utilized, including, for example, sensors 206, switches, and joysticks, as well as a combination thereof. FIG. 9 depicts an embodiment in which one or more sensors 206, such as, for example, force sensors, are positioned at locations at, or adjacent to, locations at which the user can grab or grasp the charging connector 110, such as, for example, on or within the handles 148a, 148b of the charging connector 110. According to such an embodiment, the sensors 206 can detect forces that the user exerts on the handles 148a, 148b. Such information from the sensors 206 can be provided to a controller 208 to determine the direction(s) that the user is, or is attempting, to displace the charging connector 110.

The controller 208, which can be housed at variety of different locations, including, for example, within the charging connector 110 or charging station 104, can include a processing device, such as, for example, a programmable, dedicated, and/or hardwired state machine, or any combination thereof. The processing device of the controller 208 can also include one or more processors such as, for example, Arithmetic-Logic Units (ALUs), Central Processing Units (CPUs), Digital Signal Processors (DSPs), or the like. Processing devices with multiple processing units can also utilize distributed, pipelined, and/or parallel processing. The processing device of the controller 208 can also be dedicated to performance of just the operations described herein, or can be utilized in one or more additional applications. In the depicted form, the processing device of the controller 208 is of a programmable variety that executes algorithms and processes data in accordance with operating logic as defined by programming instructions (such as software or firmware) stored in a memory 210 of the controller 208. Alternatively or additionally, the operating logic can be at least partially defined by hardwired logic or other hardware. The processing device of the controller 208 can include one or more components of any type suitable to process the signals received from the input device 206, and to provide desired output signals. Such components can include digital circuitry, analog circuitry, or a combination of both.

The memory 210 can be included with the, and/or coupled to, the controller 208. Further, the memory 210 can be of one or more types, such as a solid-state variety, electromagnetic variety, optical variety, or a combination thereof. Additionally, the memory 210 can be volatile, nonvolatile, or a combination thereof, and some or all of the memory 210 can be of a portable variety, such as a disk, tape, memory stick, cartridge, or the like. In addition, according to certain embodiments, the memory 210 can store data that is manipulated by the operating logic of the processing device of the controller 208, such as data representative of signals received from the input device 206, in addition to, or in lieu of, storing programming instructions defining the operating logic.

The controller 208 can be communicatively coupled to one or more actuators 200a, 200b of the cable suspension post 102, 202, 302, 402, 502. For example, according to the depicted embodiment, the cable suspension post 102, 202, 302, 402, 502 can include at least a first actuator (actuator$_1$) 200a and an associated driver (driver$_1$) 202a that is positioned and structured to facilitate rotational displacement of the suspension arm 114 about the post joint 150 and/or at least a second actuator (actuator$_2$) 200b and an associated driver (driver$_2$) 202b that is positioned and structured to facilitate displacement, such as, for example, rotational or pivotal displacement, of at least a portion of the suspension arm 114 about the arm joint 172. A variety of devices can be utilized for the actuators 200a, 200b, including, for example, servomotors and stepper motors, among other types of motors and devices. The actuators 200a, 200b can each be coupled to a driver (driver$_1$, driver$_2$) 202a 202b that is coupled to the support post 112 and/or suspension arm 114 such that actuation of the associated actuator 200a, 200b is translated into rotational and/or pivotal displacement at least a portion of the suspension arm 114 along, or relative to, the post joint 150 and/or arm joint 172 via, at least in part, movement of at least a portion of the associated driver 202a, 202b. For example, according to certain embodiments, the driver 202a, 202b can be a gear system, including, but not limited to, a gear drive system, such as, but not limited to, a gear box, planetary gear system, rack and pinion system, and/or worm gear system, a belt drive system, and/or a chain drive system, among other types of direct or indirect drive systems.

Thus, according to the embodiment depicted in FIG. 9, based on a determination of the direction(s) the user is at least attempting and/or intending to displace the charging connector 110 via information provided through the user's interaction with the input device 206, or sensors 206, the controller 208 can determine which actuator(s) 200a, 200b is/are to be actuated to facilitated such displacement. Moreover, for example, the controller 208 can determine to issue a first signal that actuates the first actuator 200a so as to facilitate movement of the suspension arm 114 about, or relative to, the post joint 150, and/or to issue a second signal that actuates the second actuator 200b so as to facilitate movement of the suspension arm 114 about, or relative to, the arm joint 172. Additionally, the information provided by the input device 206, which, again, in the embodiment depicted in FIG. 9 is a force sensor(s) 206, to the controller 208 can also be used to determine a duration that the actuator(s) 200a, 200b is/are to be actuated and/or the distance that the suspension arm 114 is to be displaced about the post joint 150 and/or arm joint 172. For example, the degree of force and/or duration of time that the user exerts at least a predetermined level of force on the sensors 206 can be used by the controller 208 to determine, or otherwise predict, the extent, degree, and/or duration that the actuator(s) 200a, 200b is/are to be actuated to displace the suspension arm 114 along the post joint 150 and/or arm joint 172. According to certain embodiments, the controller 208 can determine the actuators 200a, 200b are not be actuated, or actuation of the actuators 200a, 200b is to cease, at least when the force exerted by the user on the force sensors 206 falls below a predetermined level.

Figure 10:
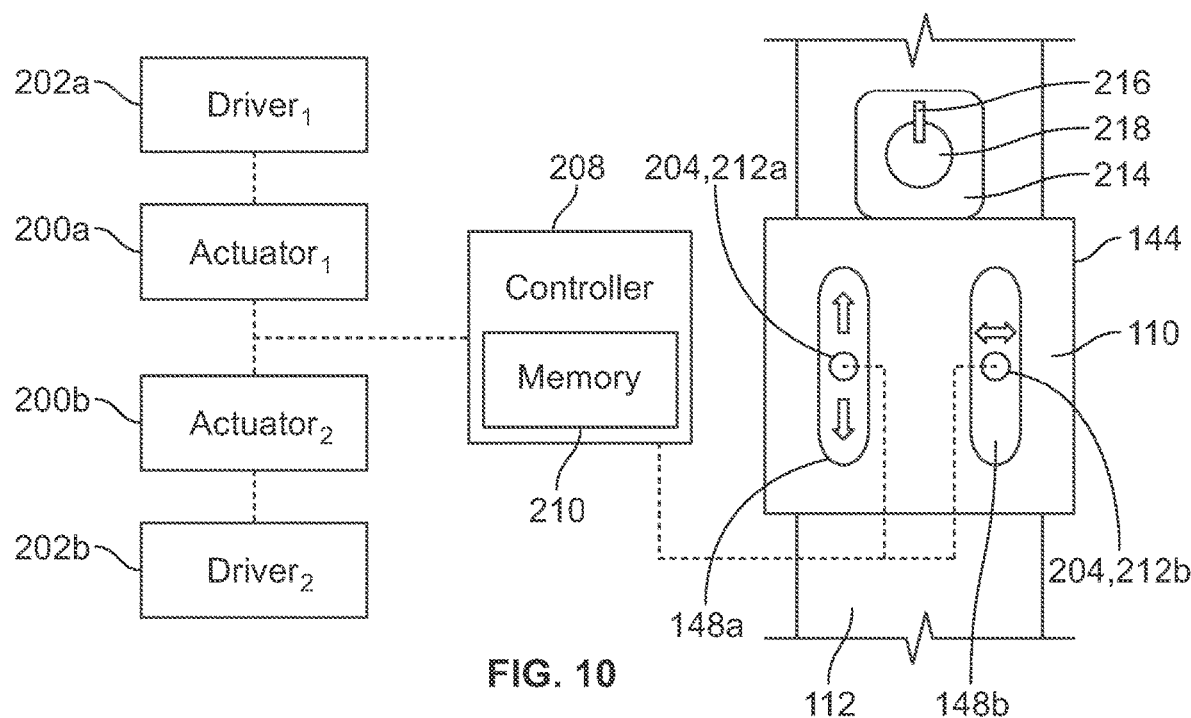
FIG. 10 illustrates a block diagram of a user input system utilized to facilitate powered movement of at least a portion of a cable suspension post at least in connection with the positioning a charging connector of the charging system.

FIG. 10 illustrates an embodiment similar to that of FIG. 9, with the exception that rather than utilizing force sensors 206, the input device 206 is one or more toggle switches and/or joysticks 212a, 212b. For example, as seen in FIG. 10, according to certain embodiments, a first toggle switch 212a that is associated with vertical movement of the charging connector 110, and thus movement of the suspension arm 114 about the arm joint 172, is mounted to a first handle 148a of the housing 144 of the charging connector 110, while a second toggle switch 212b that is associated with linear movement of the charging connector 110 along a direction generally toward/away from the adjacent side 157 of the electric vehicle and/or in a direction generally toward one of the front end 158 and rear end 160 of the vehicle 156 that can be associated with movement of the suspension arm 114 about the post joint 150, is mounted to a second handle 148b of the housing 144. Similar to the embodiment depicted in FIG. 9, information provided by operation of the toggle switches 212a, 212b can be used by the controller 208 to determine which actuator(s) 200a, 200b is/are to be activated, and the extent or direction the actuator(s) 200a, 200b is/are to be actuated to displace the suspension arm 114 about the post joint 150 and/or arm joint 172 to a location that corresponds to the charging connector 110 being displaced to an intended location, such as, for example, a location at which the charging connector 110 is aligned for coupling to the mating connector 155 (FIG. 4) of the electric vehicle 156. While FIG. 10 illustrates separate toggle switches 212a, 212b, according to other embodiments, a single joystick, among other input devices 204, can be utilized to provide information from the user of an intended direction(s) of displacement of the charging connector 110.

FIG. 10 also illustrates the housing 144 of the charging connector 110 including, or being coupled to, a first attachment body 214 that is configured to matingly engage a second attachment body 216 that is coupled to the support post 112. Moreover, the first attachment body 214 and the second attachment body 216 can be configured such that, when the first attachment body 214 is engaged with the second attachment body 216, the charging connector 110 can be retained in a position relative to the support post 112. Thus, for example, when not in use, the engagement of the first attachment body 214 and the second attachment body 216 can be used to retain a position of the charging connector 110. According to the non-limiting exemplary embodiment shown in FIG. 10, the first attachment body 214 includes a orifice 218 that is sized to receive insertion of the second attachment body 216, such as, for example, a hook, that can securely engage the first attachment body 214. According to certain embodiments, a portion of the second attachment body 216 can be pivoted into a retaining position, as shown in FIG. 10, such that a user may not need to lift the charging connector 110 to position about at which the first attachment body 214 can be securely engaged by the second attachment body 216. However, a variety of other devices and connections can be utilized for the first attachment body 214 and the second attachment body 216.

Figure 11:
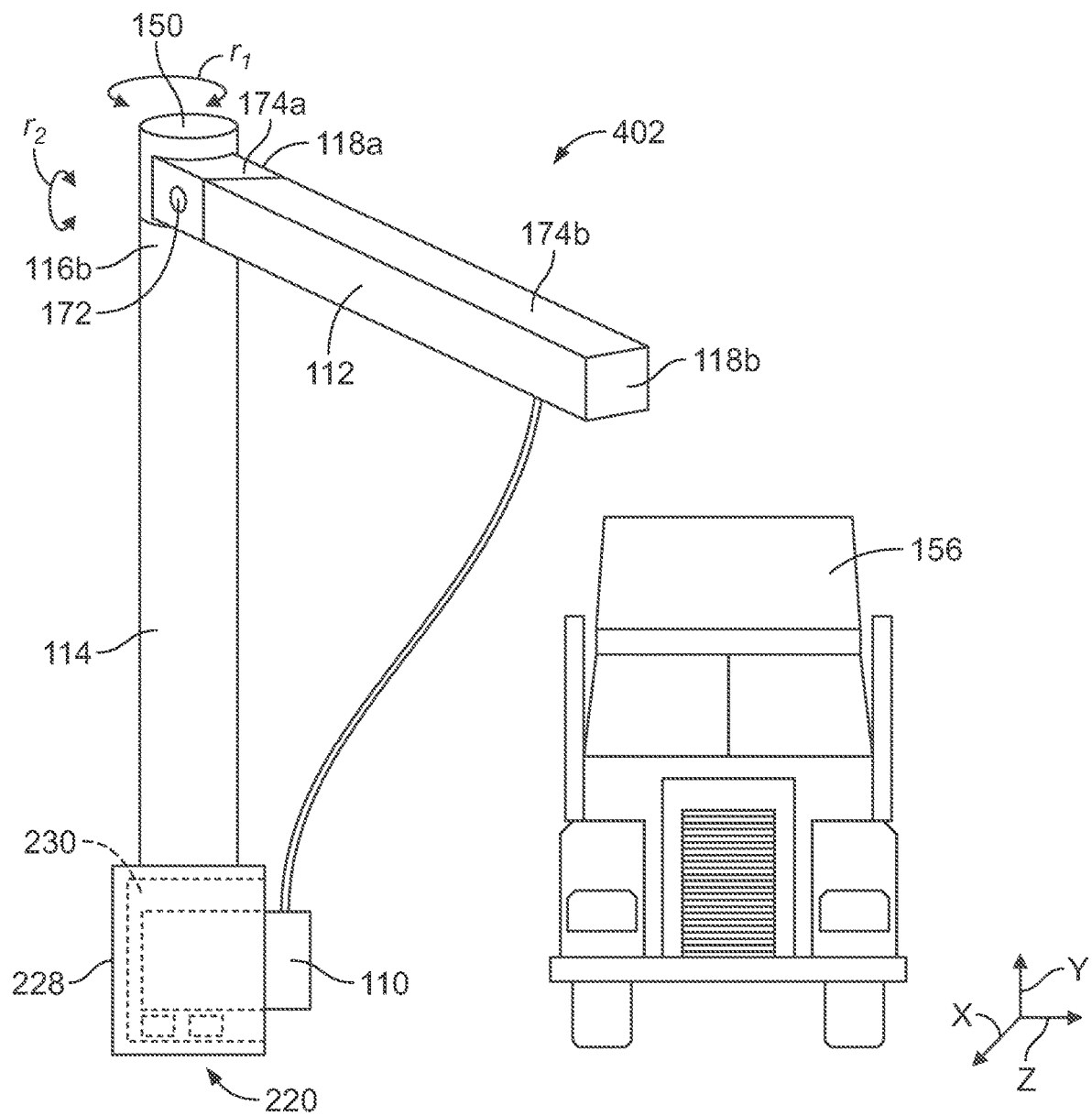
FIG. 11 illustrates a front view of an exemplary charging system that includes a cable suspension post and an automatic connection device (ACD) according to an illustrated embodiment of the present application.
Figure 12:
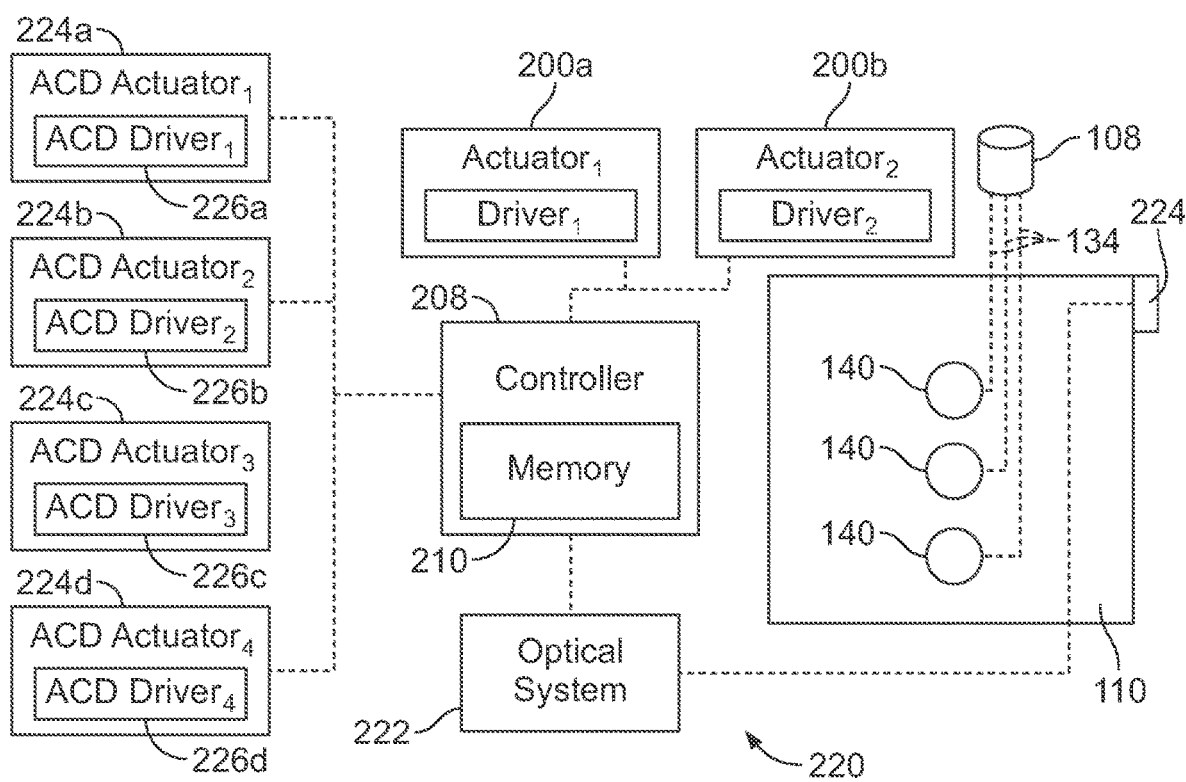
FIG. 12 illustrates a block diagram of the exemplary charging system shown in FIG. 11.

FIGS. 11 and 12 illustrate a portion of an exemplary embodiment of a charging system 100' that further includes an automated connection device (ACD) 220 that can be configured to align the charging connector 110, and/or displace the charging connector 110 into engagement, with the mating connector 155 of the electric vehicle 156. Thus, for example, rather than utilizing forces and/or input information from the user to align and engaged the charging connector 110 with the connector 155 of the vehicle 156, such alignment and/or connection can be automatically provided by the ACD 220. According to the illustrated embodiment, the ACD 220 can include, or otherwise be coupled to, a controller 208 and memory 210, which can be similar to the controller 208 and memory 210 discussed above with respect to FIGS. 9 and 10.

The ACD 220 can be configured to detect the position of the connector 155 of the electric vehicle 156, and/or the position of the connector 155 of the electric vehicle 156 relative to the position of the charging connector 110 and/or ACD 220 in a variety of manners. For example, as shown in FIG. 12, according to certain embodiments, the ACD 220 can include a recognition system, such as, but not limited to, an optical system 222 having a camera 224 or other optical or visual sensing device. The camera 224 can be used to detect one or more position indicators or reference points on the electric vehicle 156, including for example, on or around the mating connector 155 of the vehicle 156. A variety of different types of position indicators or reference points can be utilized, including, but not limited to, single and/or two-dimensional barcodes, tags, codes, and/or symbols. Information provided by the optical system 222, which may or may not be continuously provided by the optical system 222 to the controller 208, can be utilized by the controller 208 to determine what, if any, adjustments are needed in the positioning and/or orientation of the charging connector 110. Moreover, based on a determination of the position and/or orientation of the charging connector 110 relative to the mating connector 155 of the vehicle 156, the controller 208 can determine which of a plurality of ACD actuators 224a-d and associated ACD drivers 226a-d are to be activated, and the extent and/or duration of such activation, as well as adjustments in such activation, that can be used to achieve alignment and/or engagement of the charging connector 110 with the mating connector 155 of the vehicle 156. The ACD actuators 224a-d and associated ACD drivers 226a-d may, or may not, be similar to the types of actuators and drivers 202a, 202b discussed above with respect to at least FIGS. 9 and 10. Further, each actuator 224a-d can be configured to displace the charging connector 110 in one or more directions. For example, according to the illustrated embodiment, a first ACD actuator 224a and associated ACD driver 226a can be used to displace the charging connector 110 generally along at least a first axis, such as, for example, a vertical ("y") axis, a second ACD actuator 224b and associated ACD driver 226b can be used to displace the charging connector 110 generally along at least a second axis, such as, for example, an axis ("z" axis) that adjusts the position of the charging connector 110 relative to at least the front end 158/rear end 160 of the vehicle 156, and a third ACD actuator 224c and associated ACD driver 226c can be used to displace the charging connector 110 generally along at least a third axis, such as, for example, an axis ("x" axis) that adjusts the position of the charging connector 110 relative to at least an adjacent side 157 of the vehicle 156. The ACD 220 can also include other ACD actuators and associated ACD drivers that can adjust other orientations of the charging connector 110, such as, for example, an ACD actuator(s) 224d and associated driver(s) 226d that can adjust the pitch, roll, and/or yaw of the charging connector 110 so as to facilitate electrical coupling of the charging connector 110 and the mating connector 155 of the vehicle 156.

According to certain embodiments, the ACD 220 can include a housing 228 that can be mounted to the ground 174 that may, or may not, house at least a portion of the charging connector 110, controller 208, memory 210, ACD actuators 224a-d, and/or the drivers 226a-d. For example, as shown by at least FIG. 11, the housing 228 can be include an inner cavity 230 that can house at least a portion of the charging connector 110. During activation of one or more ACD actuators 224a-d, at least a portion of the charging connector 110 can extend away from the housing 228 as the charging connector 110 is displaced into alignment and/or mating engagement with the connector 155 of the electric vehicle 156.

The ACD 220 can be utilized with any of the previously discussed cable suspension posts 102, 202, 302, 402, 502, and the associated conductors and/or charging cable(s) 108 configurations. Further, according to certain embodiments in which the cable suspension post 102, 202, 302, 402, 502 includes one or more actuators 200a, 200b that are positioned and structured to facilitate displacement of at least a portion of the suspension arm 114 about, or relative to, the post joint 150 and/or arm joint 172, such actuation of the actuator(s) 200a, 200b can be controlled by the controller 208 of the ACD 220. For example, based on a determination of the extent the charging connector 110 is to be displaced to be moved into alignment and/or engagement with the mating connector of the electric vehicle 156, the controller 208 can determine whether to, in addition to activating one or more ACD actuators 224a-d, activate one or more actuator(s) 200a, 200b so as to adjust at least a position of the suspension arm 114 about the post joint 150 and/or arm joint 172, and thus adjust the position of the charging cable 108 that is suspended therefrom, in one or more directions.

According to certain embodiments, the ACD 220 can also include a sensor that can be communicatively coupled to the controller 208 that can indicate when the charging connector 110 has been placed into mating electrical engagement with the connector 155 of the vehicle 156. Upon detection of such mating engagement, the controller 208 can be configured to begin the process of supplying electrical power through the charging connector 110 and to the vehicle 156, and more specifically, for the battery(ies) of the vehicle 156. Alternatively, following mating engagement of the charging connector 110 with the connector 155 of the vehicle 156, the charging process may not commence until user interaction with the charging system 100', such as, for example, the user activating an on switch or button on the ACD 220 and/or charging station 104. The ACD 220 and/or charging station 104 can be further configured to determine when a charging process is completed, as previously discussed, such as, for example, when charging of the battery(ies) of the vehicle 156 has reached completion. Following detection of completion of the charging process, the controller 208 can issue a command(s) to actuate one or more of the ACD actuators 224a-d and/or the actuators 200a, 200b associated with the post joint 150 and arm joint 172, such that the charging connector 110 is disengaged from the connector 155 of the vehicle 156. Such commands may further actuate the ACD actuators 224a-d and other actuators 200a, 200b such that the charging connector 110 is returned to a home position, such as, for example, a position at which at least a portion of the charging connector 110 is moved into, or within closer proximity to, the housing 230 of the ACD 220.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A system comprising:
   a charging station configured to output a supply of electrical power;
   a cable suspension post having a support post and a suspension arm, the suspension arm being coupled to the support post at one end of the suspension arm and at least vertically suspended away from the support post;
   a charging cable electrically coupled to the charging station, at least a portion of the charging cable being suspended from the suspension arm; and
   a charging connector electrically coupled to, and free-hanging from, the suspended portion of the charging cable, the charging connector being swingingly displaceable with the suspended portion of the charging cable,
   wherein at least a portion of the suspension arm is at least vertically pivotal relative to at least another portion of the suspension arm and/or relative to the support post so as to accommodate adjustment of a vertical position of at least a suspended end of the suspension arm,
   wherein the suspension arm is rotatable relative to at least one of (1) the support post, and (2) another portion of the suspension arm, and further wherein the cable suspension post includes at least one actuator and at least one driver, the at least one driver coupled to at least one of the suspension arm and the support post and configured to facilitate rotatable displacement of the suspension arm upon actuation of the at least one actuator.

2. The system of claim 1, wherein the suspension arm is fixed at only a first end of the suspension arm, and wherein the suspended portion of the charging cable is suspended from a second end of the suspension arm, the first end and the second end being at opposing ends of the suspension arm.

3. The system of claim 2, wherein at least a portion of the suspension arm is at least 4 meters above an adjacent ground surface.

4. The system of claim 1, wherein the charging station is configured to output around 150 kilowatts to around 8 megawatts of electrical power.

5. The system of claim 1, wherein the suspension arm is rotatably coupled to the support post.

6. The system of claim 1, wherein the suspension arm is rotatable about a central longitudinal axis of the support post.

7. The system of claim 1, wherein the suspension arm is rotatably coupled to the support post.

8. The system of claim 1, wherein the charging connector includes an input device configured for engagement by a user of the system, the input device providing information that at least initiates actuation of the at least one actuator.

9. The system of claim 8, wherein the input device comprises one or more force sensors that are coupled to one or more handles of the charging connector.

10. The system of claim 8, wherein the input device includes at least one toggle switch.

11. The system of claim 1, wherein the support post has an inner pathway within the support post that houses a portion of the charging cable.

12. The system of claim 1, further including a biasing element configured to at least partially control a speed at which the vertical position of the suspended end of the suspension arm is adjustable.

13. A system comprising:
   a charging station configured to output a supply of electrical power;
   a cable suspension post having a support post and a suspension arm, the suspension arm being suspended away from the support post, at least a suspended end of the suspension arm being rotatably displaceable relative to at least one of the support post and another portion of the suspension arm;
   a charging cable electrically coupled to the charging station, at least a portion of the charging cable being suspended from the suspended end of the suspension arm; and
   a charging connector suspended from the suspension arm only by the suspended portion of the charging cable, the charging connector being electrically coupled to the charging cable,
   wherein the cable suspension post further includes at least one actuator and at least one driver, the at least one driver coupled to at least one of the suspension arm and the support post and configured to facilitate rotatable displacement of the suspension arm upon actuation of the at least one actuator.

14. The system of claim 13, wherein the suspended portion of the charging cable and the charging connector are at least rotatable about a single point along the suspension arm.

15. The system of claim 13, wherein the charging connector includes an input device configured for engagement by a user of the system, the input device providing information that at least initiates actuation of the at least one actuator.

16. The system of claim 15, wherein the input device comprises one or more force sensors that are coupled to one or more handles of the charging connector.

17. A charging system for automatic alignment with, and electrical coupling to, a connector of an electric vehicle, the system comprising:
   a charging station configured to output a supply of electrical power;
   a cable suspension post having a support post and a suspension arm, the suspension arm being suspended away from the support post;
   a charging cable electrically coupled to the charging station, at least a portion of the charging cable being downwardly suspended from the suspension arm; and
   a connection device comprising a charging connector, a recognition system, a controller, and a plurality of connection actuators, the charging connector being electrically and mechanically coupled to an end of the suspended portion of the charging cable, the recognition system configured to detect a location of one or more position indicators on at least a portion of the electric vehicle, the controller configured to receive, from the recognition system, information regarding the location of the one or more position indicators and to issue at least an actuation signal to one or more of the plurality of connection actuators to displace the charging connector into alignment, and/or engagement, with the connector of the electric vehicle.

18. The charging system of claim 17, wherein the recognition system is an optical recognition system.

19. The charging system of claim 17, wherein at least a suspended end of the suspension arm is rotatably displaceable relative to at least one of the support post and another portion of the suspension arm.

* * * * *